United States Patent [19]

Iwata et al.

[11] 4,351,498

[45] Sep. 28, 1982

[54] CASSETTE TAPE DEVICE

[75] Inventors: Mitsuo Iwata; Naomasa Masuda; Hideki Uraki; Kunio Tsuchino, all of Tottori, Japan

[73] Assignees: Sanyo Electric Co., Ltd., Osaka; Tottori Sanyo Electric Co., Ltd., Tottori, both of Japan

[21] Appl. No.: 188,979

[22] Filed: Sep. 19, 1980

[30] Foreign Application Priority Data

Sep. 19, 1979 [JP] Japan .............................. 54-120987
Jan. 31, 1980 [JP] Japan .............................. 55-11077
Jun. 5, 1980 [JP] Japan .............................. 55-76281

[51] Int. Cl.$^3$ .......................... G03B 1/04; G11B 15/32
[52] U.S. Cl. ..................................... 242/204; 360/74.2
[58] Field of Search ............................. 242/200–204, 242/198, 191; 360/71, 74.2, 74.3, 96.4, 105

[56] References Cited

U.S. PATENT DOCUMENTS

| | | | |
|---|---|---|---|
| 3,433,428 | 3/1969 | Schatteman | 242/191 |
| 3,936,877 | 2/1976 | Maruyama et al. | 360/96 |
| 3,937,422 | 2/1976 | Kato | 242/204 |
| 4,214,283 | 7/1980 | Fushimi et al. | 360/71 |
| 4,263,631 | 4/1981 | Takanashi | 360/105 |

Primary Examiner—Leonard D. Christian
Attorney, Agent, or Firm—Armstrong, Nikaido, Marmelstein & Kubovcik

[57] ABSTRACT

A cassette tape device includes a tape drive mechanism provided to move between a play position in which the tape is advanced and a release position in which the tape is stopped and released from any tension, a detector for detecting whether or not the tape is driven, a latch element provided for prohibiting the advance of the tape when the tape drive mechanism is in the release position and for allowing the tape to advance when the tape drive mechanism is in the play position, shifting mechanism for shifting the tape drive mechanism from the release position to play position when the detector detects that the tape is not advancing, and retaining member for retaining the tape drive mechanism in the play position.

9 Claims, 20 Drawing Figures

CASSETTE TAPE DEVICE

The present invention relates to a cassette type magnetic tape recording and/or reproducing device, and more particularly, to an arrangement of the tape recording and/or reproducing device which automatically plays the tape when the power is supplied and which automatically stops playing when the power is cutoff.

Recently, it has become popular to equip automobile with cassette players in addition to a radio receiver. Generally, the cassette player has a tape drive mechanism, e.g., two pinch rollers, each rotatably mounted on a shaft movable between a play position in which the pinch roller is held in contact with a capstan with a tape held therebetween for advancing the tape by the driving force produced from the capstan, and a release position in which the pinch roller is separated away from the capstan to stop advancing the tape.

Usually, an automobile has a main electric power switch switched on and off by the turning of an ignition key inserted to start the automobile. When the main switch is on, electricity is supplied from a source, for example a battery, to the tape player or radio receiver allowing operation. If the automobile's main switch is turned off during play, the cassette normally remains held in the play position with only the tape player's motor being cutoff. In such a situation, a pinch roller provided for transmitting the motor's drive to the tape remains tightly held in contact with the capstan. This has the disadvantage that the pinch roller may become so deformed that afterwards, when play is resumed, there will be unacceptable wow in the tape players reproduced signal. Further, the portion of the tape tightly held between one of the cassette reels and the pinch roller and capstan junction during power cutoff may be undesirably permanently stretched.

A device for stopping the action of the tape drive mechanism when the electric power is cutoff is disclosed in U.S. Pat. No. 3,433,428 to E. A. M. Schatteman issued Mar. 18, 1969, entitled Stop System For Tape Decks. This system comprises a solenoid which is so actuated as to release the tape drive mechanism away from the tape when the power is cutoff.

Another above described type of device is disclosed in U.S. Patent Application Ser. No. 86,318 of M. Iwata et al. filed Oct. 19, 1979, entitled Cassette Loading And Unloading Device, assigned to the same assignee as the present application. This device comprises an electromagnet which, during the tape play, holds a locking member to maintain the tape drive mechanism in a play position, and at the same time, the cassette in a loaded position. When the power is cutoff, the electromagnet releases the loading member to automatically shift the tape drive mechanism away from the tape and to eject or unload the cassette.

In either one of the above described references, the device does not automatically return, when the power is supplied again, the tape drive mechanism to the play position to continue playing the tape.

Accordingly, a primary object of the present invention is to provide a cassette tape device which automatically shifts the tape drive mechanism to a play position to advance and play the tape when the electric power is supplied and which automatically returns the tape drive mechanism to a release position to cease advancing and stop playing the tape.

It is another object of the present invention to provide a cassette tape device of the above described type which can automatically change the direction of tape advance when the tape reaches its one end, or at a moment when it is so desired.

It is a further object of the present invention to provide a circuit system which can selectively supply electric power to the cassette tape device of the above described type and an electrical device, such as a radio receiver, provided in combination with the cassette tape device.

In accomplishing these and other objects, a cassette tape device according to the present invention comprises a means for detecting when first and second spindle means, adapted to receive the reels of the cassette, are not driven, and a latch engageable to at least one of the first and second spindle means when the tape drive mechanism is in the release position. The latch means is disengaged from the spindle means when the tape drive mechanism is moved to the play position. The cassette tape device further comprises a means for shifting the tape drive mechanism from its release position towards its play position when the detecting means detects that the first and second spindle means are not driven, and a means for retaining the tape drive mechanism in the play position.

These and other objects and features of the present invention will become apparent from the following description taken in conjunction with a preferred embodiment thereof with reference to the accompanying drawings, throughout which like parts are designated by like reference numerals, and in which.

Figure 1:
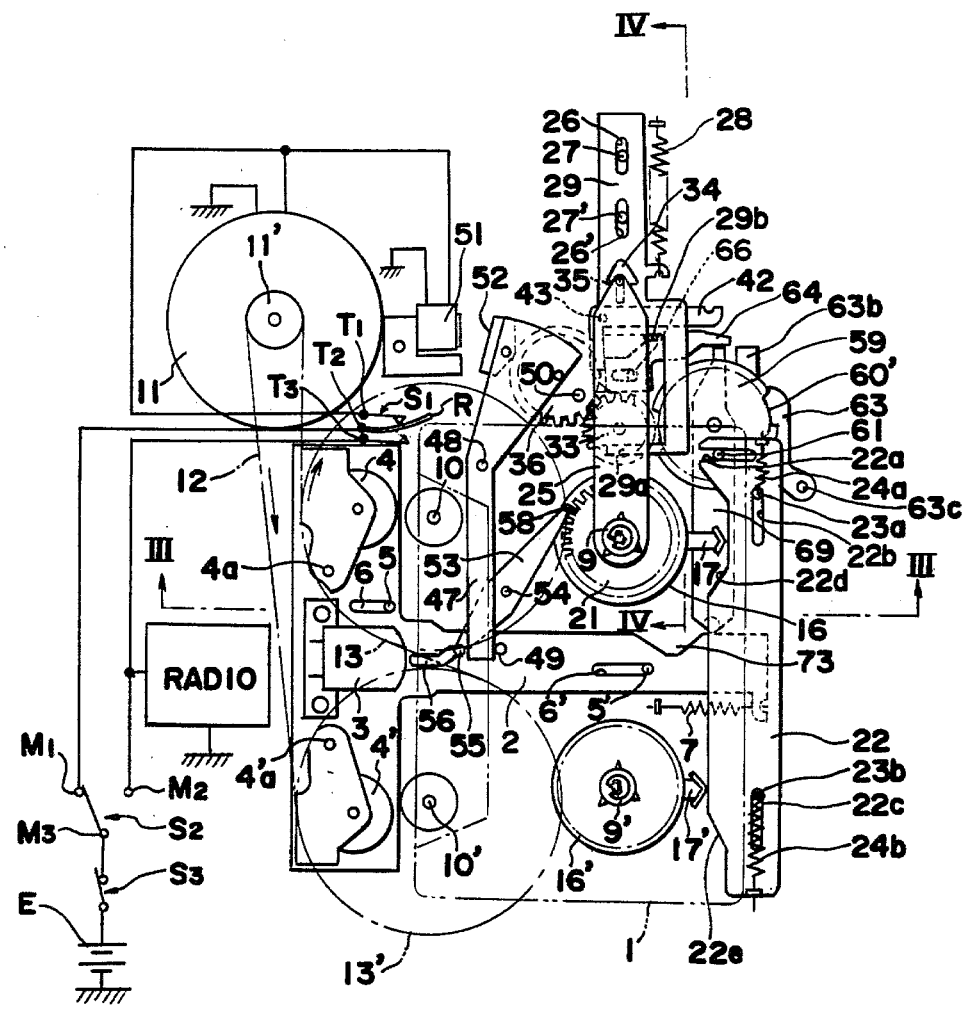
FIG. 1 is a schematic top plan view of a cassette tape device according to the present invention.

Referring to FIG. 1, a cassette tape device according to the present invention includes a pair of spindles 9 and 9' adapted to receive reels (not shown) of a cassette tape 1, and a pair of capstans 10 and 10' which can be inserted into capstan receiving holes formed in the cassette tape 1. The mechanism for driving the spindles 9 and 9', and the capstans 10 and 10' is described later.

Provided in association with the capstans 10 and 10' is a tape drive mechanism constituted by a T-shaped carrier plate 2 carrying a magnetic head 3 at a junction of two bars in the figure T. The magnetic head 3 is adapted to reproduce or record sound signals when a magnetic tape slidingly moves past the head 3. The T-shaped carrier plate 2 further carries a pair of pinch rollers 4 and 4' on the opposite sides of the magnetic head 3. Slots 6 and 6' are formed in the carrier plate 2 for receiving, respectively, pins 5 and 5' fixedly mounted on a frame or chassis (not shown) to allow the carrier plate 2 to move right- and left-hand directions when viewed in FIG. 1. A spring 7 is connected between the carrier plate 2 and the frame for urging the carrier plate 2 towards left-hand direction.

Figure 13:
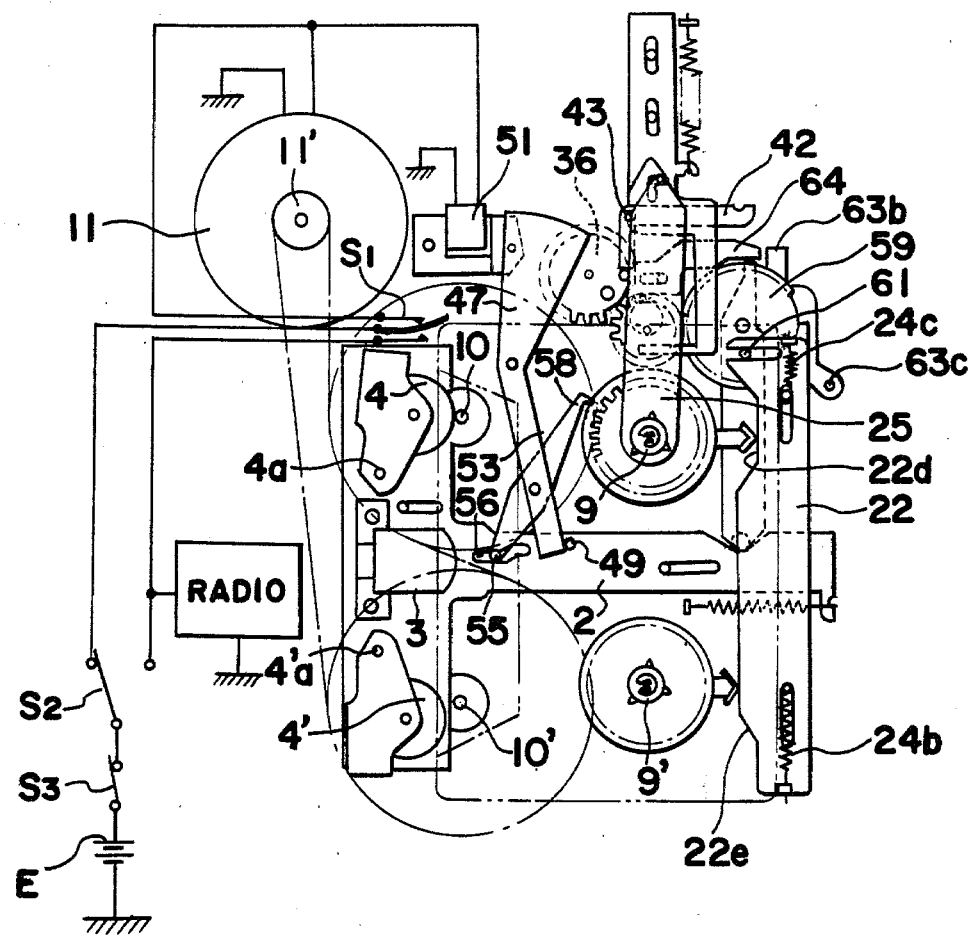
FIG. 13 is a view similar to FIG. 1, but particularly shows a condition in which the cassette tape device is actuated.

When the carrier plate 2 is moved to the right-hand direction against the biasing force of the spring 7, as shown in FIG. 13, the tape drive mechanism terminates at a play position in which at least one of the pinch rollers 4 and 4' is pushed against the corresponding capstans 10 and 10' with the magnetic tape held between each associated spindle and pinch roller for advancing the tape by the driving force produced from the capstans 10 and 10' and, at the same time, the magnetic head 3 is disposed in contact with the moving magnetic tape. During the play position, a spindle located at a leading side of the moving tape is driven to take-up and wound the coming tape on the engaged reel.

On the contrary, when the carrier plate 2 is moved to the left-hand direction, as shown in FIG. 1, the tape drive mechanism terminates at a release position in which the pinch rollers 4 and 4' are separated away from the capstans 10 and 10', respectively, for moving the tape. In this position, the magnetic head 3 is held away from the tape.

Figure 2:
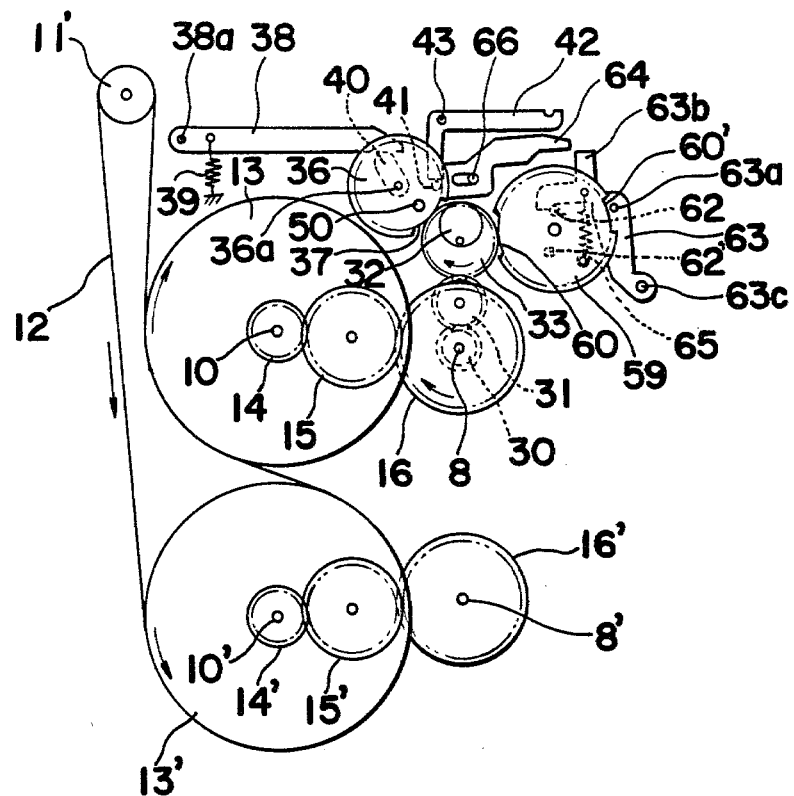
FIG. 2 is a schematic top plan view of a gear arrangement employed in the cassette tape device of FIG. 1.

Referring to FIGS. 1 and 2, the mechanism for driving the spindles and capstans includes a motor 11, and a pair of flywheels 13 and 13' which are coaxially mounted on the shafts of the capstans 10 and 10', respectively. A pulley 11' on the motor 11 and the flywheels 13 and 13' are linked by an endless belt 12 to rotate, when the motor 11 is energized, the flywheel 13 in a clockwise direction and the flywheel 13' in a counterclockwise direction.

Figure 3:
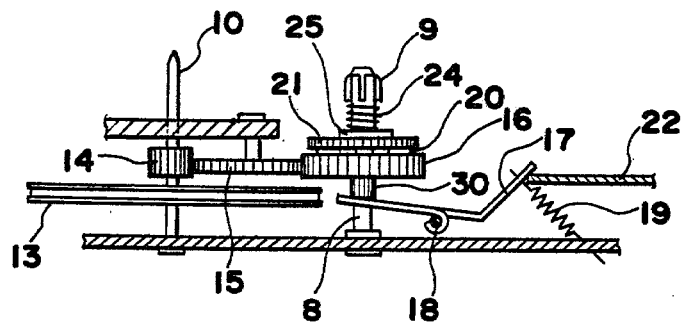
FIG. 3 is a side sectional view taken along a line III—III shown in FIG. 1.

The driving force of the flywheel 13 is transmitted through a train of gears 14 and 15 to a gear 16 rotatably mounted on a shaft 8, as shown in FIG. 3. The shaft 8 is further mounted with a gear 21 and a small diameter gear 30. The gear 30 is formed integrally with the large diameter gear 16, so that whenever the motor is energized, the small diameter gear 30 rotates. The gear 21, which is integrally formed with the spindle 9 is connected to the gear 16 through a clutch member 20 made of a material having a high frictional properties, such as a felt. A lever 17 is pivotally provided on a pin 18 extending from the frame. One end of the lever 17 is held in contact with a side surface of the small diameter gear 30 while the other end thereof is connected to a spring 19 biasing the lever 17 to rotate in a clockwise direction thus urging the gear 16 against the gear 21. Accordingly, the driving force of the gear 16 is normally transmitted to the spindle 9. However, when an actuating lever 22 described in detail later pushes the lever 17 to rotate in a counterclockwise direction against the biasing force of the spring 19, the gears 16 and 30 are moved down along the shaft 8 by their own weight to disconnect the gear 21 from the gear 16. In this position, the gear 21 and the spindle 9 are in a condition that they may rotate freely, and the gear 16 is in the condition that it is still engaged with the gear 15.

It is to be noted that, during the rotation of the spindle 9, the spindle 9 can forcibly be stopped, when an external load, such as one produced when the reel on the spindle 9 stops upon termination of tape to its one end, or one produced when a lock lever 53 (described later) locks the gear 21, is applied. In this case, the gears 16 and 30 continuously rotates regardless of the external load.

Similarly, the driving force of the flywheel 13' is transmitted through a train of gears 14' and 15' to a gear 16' rotatably mounted on a shaft 8'. Furthermore, the gear 16' is connected through a clutch member to the spindle 9'.

Figure 4:
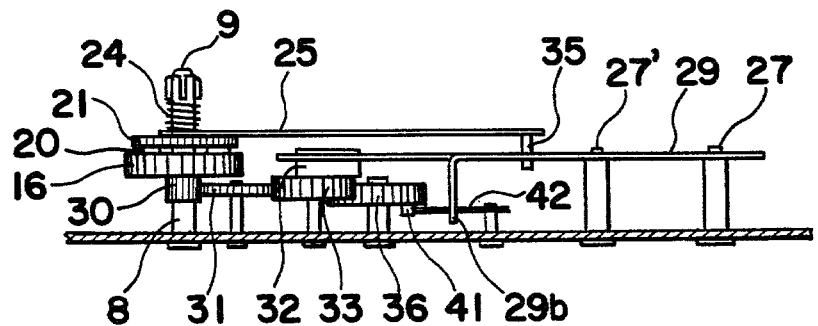
FIG. 4 is a side sectional view taken along a line IV—IV shown in FIG. 1.

The gear 30 is engaged, as best shown in FIG. 2, with a gear 31, which is in turn engaged with a gear 33. The gear 33 has a cam member 32 fixedly mounted thereon. Provided in association with the cam member 32 is an elongated plate member 29 (FIG. 1) formed with a pair of slots 26 and 26' for receiving, respectively, pins 27 and 27' extending from the frame for allowing the plate member 29 to move in a radial direction about the center of the spindle 9, i.e., up and down directions when viewed in FIG. 1. A spring 28 is extended between the plate member 29 and the frame for urging the plate member 29 upwardly. Lower end of the plate member 29 is formed with an engagement bar 29a extending in a direction perpendicular to the direction of movement of the plate member 29. A side of the bar 29a remote from the spindle 9 is normally held in contact with the cam member 32 causing the plate member 29 to move reciprocatingly relative to the rotational movement of the cam member 32. The plate member 29 is further formed with an opening 34 having a configuration of arrowhead pointing a direction away from the spindle 9. Inserted in the opening 34 is a pin 35 provided at one end of an elongated plate 25. The other end of the elongated plate 25 is pivotally mounted on the spindle 9, as best shown in FIGS. 3 and 4. Since the elongated plate 25 is held in contact with the gear 21 by the urging force of a spring 24 mounted on the spindle 9, the plate 25 tends to rotate about the spindle 9 as the gear 21 rotates. However, since the end of the plate 25 remote from the spindle 9 is engaged with the opening 34, the plate 25 may rotate within a degree defined by the distance in which the pin 35 move about in the opening 34.

Figure 5:
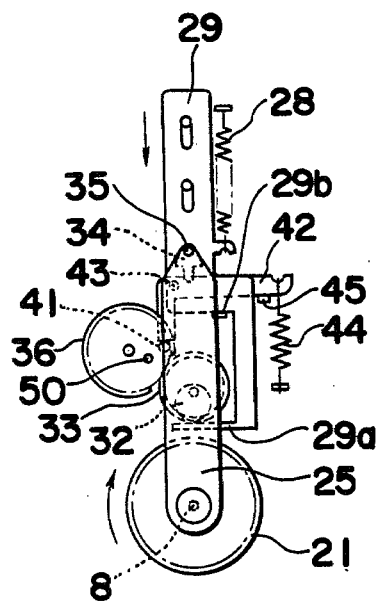
FIGS. 5, 6 and 7 are schematic views showing movement of incorporated elements.
Figure 6:
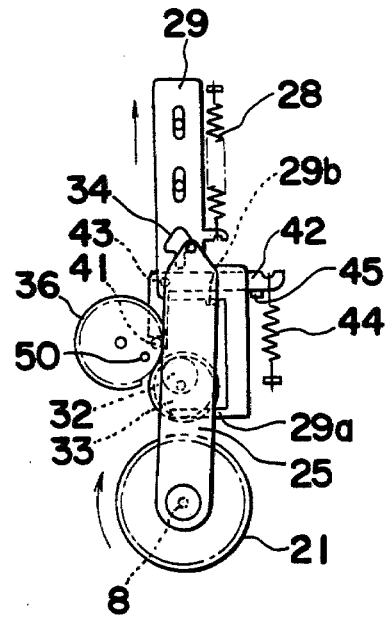

Next, the movement of the plate member 29 is explained in connection with FIGS. 5 to 8. When the cam member 32 is so positioned as to push down the plate member 29 as shown in FIG. 5, the pin 35 is located at the tip end of the arrowhead shaped opening 34. As the cam member 32 rotates, the plate member 29 moves upwardly by the urging force of the spring 28. During the upward movement of the plate 29, the pin 35 slidingly moves along one of the slanted sides a and b (FIG. 8) of the arrowhead shaped opening 34. The side to which the pin 35 moves depends on the direction of rotation of the gear 21. When the gear 21 is rotated clockwise direction as indicated by an arrow in FIG. 6, the plate 25 tends to tilt in the clockwise direction. Thus, in this case, the pin 35 slides along the slanted side a. A further upward movement of the plate 29 results in engagement between the pin 35 and a corner of the opening 34 defined by the sides a and c, as shown in FIG. 6 to prevent the plate 29 from being further moved upwards. During the pin 35 being engaged in the corner between the sides a and c, the cam member 32 continues its rotation in a detached manner from the bar 29a until it is in a mode to push down the plate 29. When the cam plate 32 contacts again with the bar 29a and pushes down the plate 29, the pin 35 slides back again along the side a towards the tip of the arrowhead shaped opening 34. This operation can be repeated so long as the gear 21 is rotated, i.e., when the spindle 9 is rotated, and when this operation is repeated, the plate 29 performs a reciprocal movement and the plate 25 performs a swinging movement.

On the contrary, when the gear 21 is not rotated, the plate 25 will not be tilted in any direction. Accordingly, the pin 35, which has been located at the tip of the arrowhead opening 34, is maintained at the position to allow a U-shaped recess portion d (FIG. 8) in the opening 34 to receive the pin 35 when the plate 29 moves upwards. In this case, the plate 29 takes a stroke longer than that has taken when the gear 21 is rotated. Before the description of operation followed by the long stroke of the plate 29 proceeds, elements associated with the plate 29 and the gear 33 are described first.

Provided in association with the reciprocating plate 29 is an L-shaped lever 42 pivotally mounted on a pin 43 at its corner portion between long and short arms. The free end of the long arm of the L-shaped lever 42 is connected to a spring 44 for urging the L-shaped lever 42 clockwise. A pin 45 mounted on a frame is held in contact with the long arm for restricting the rotation of the lever 42 in the position shown in FIG. 5. The end of the short arm of the L-shaped lever 42 is normally held in contact with a pin 41 mounted on a gear 36 for preventing the counterclockwise rotation of the gear 36.

The gear 36 positioned adjacent the gear 33 has a gear teeth removed section which, when the pin 41 is held in contact with the short arm end of the lever 42, is facing the gear 33. Accordingly, in this condition, the gear 36 is maintained disengaged from the gear 33. An arm 40 (FIG. 2) is mounted on a shaft 36a of the gear 36. The end of the arm 40 remote from the shaft 36a is held in contact with a lever 38 biased to rotate clockwise by a spring 39 about a pin 38a mounted on the frame, so as to provide an initial rotating force to the gear 36 when the contact between the pin 41 and the end of the short arm of the L-shaped lever 42 is released.

Figure 7:
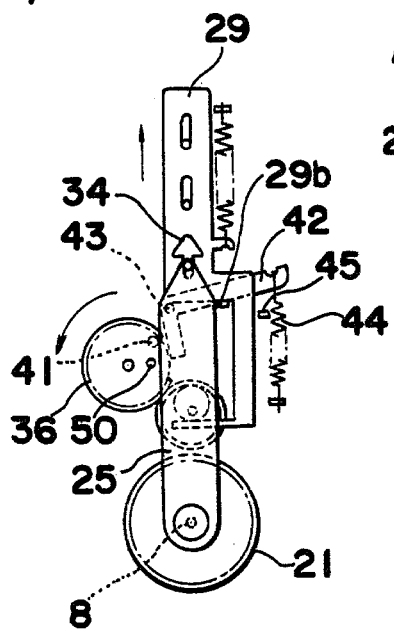
Figure 8:
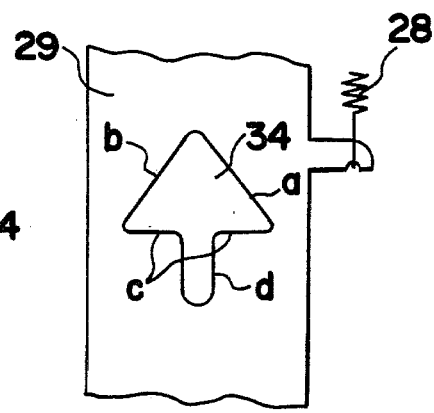
FIG. 8 is an enlarged fragmentary view of an arrowhead shaped opening formed in the incorporated element.

The reciprocating plate 29 has a hook 29b (FIG. 5) which, when the plate 29 takes the long stroke of movement, comes into contact with the L-shaped lever 42 to rotate the lever 42 counterclockwise against the biasing force of the spring 44. When the lever 42 is thus rotated, the contact between the short arm of the lever 42 and the pin 41 is released for causing the gear 36 to rotate counterclockwise as shown in FIG. 7. The initial rotating force of the gear 36 is produced by the biased lever 38 as mentioned above. Once the initial rotating force is applied, the gear 36 engages with the gear 33 and rotates one complete turn. During the rotation of the gear 36, a projection 50 mounted on the gear 36 pushes a lever 47 (FIG. 1) towards a left-hand direction.

The lever 47 is pivotally mounted on a pin 48 extending from the frame. One end portion of the lever 47 has a shape of sector with its one side located at a position capable of being pushed by the projection 50. The other side of the sector is provided with a segment 52 which can be held in contact with a electromagnet 51 provided on the frame when the lever 47 is rotated by the projection 50. The other end portion of the lever 47 is held in contact with a pin 49 mounted on a T-shaped carrier plate 2 for moving the carrier plate 2 rightwardly, when the lever 47 is rotated, to terminate the tape drive mechanism to the play position mentioned above. The termination of the tape drive mechanism to the play position is maintained by the attractive force between the electromagnet 51 and the segment 52.

By the time gear 36 completes its one turn, the L-shaped lever 42 is returned to its original position to again engage the pin 41 with the end of the short arm of the L-shaped lever 42.

Illustrated in FIG. 1 in assembly with T-shaped carrier plate 2 is a latch member 53 pivotally mounted on a pin 54. The latch member 53 has at its one end a hook 58 engageable to the gear 21 and at its other end a pin 55. When the T-shaped plate 2 is moved to the left-hand direction, as shown in FIG. 1, i.e., when the tape drive mechanism terminates at the release position, the pin 55 is held in contact with a right-hand end of a groove 56 formed in the carrier plate 2 for urging the hook 58 in an engaged condition with the teeth of the gear 21 to prevent rotation of the gear 21. On the other hand, when the T-shaped carrier plate 2 is moved to the right-hand direction, as shown in FIG. 13, i.e., when the tape drive mechanism terminates at the play position, the latch member 53 is rotated counterclockwise to disengage the hook 58 from the gear 21 to free the gear 21. In this condition, the pin 55 locates at an intermediate portion of the groove 56.

Now the thorough operation of the above described mechanism for controlling the tape drive mechanism is explained.

Starting from the position of FIG. 1 in which the tape drive mechanism is positioned in the tape release position, the loading of the cassette tape to a proper position actuates a power supply circuit described later to supply an electric power to a motor 11. One example of the mechanism for loading and unloading the cassette tape is disclosed in U.S. Pat. No. 4,071,859 to Y. Sami, entitled Tape Cartridge Positioning and Ejection Device, issued Jan. 31, 1978. When the motor 11 is energized, the flywheels 13 and 13' are rotated to rotate the gears 16 and 16'. Since the latch member 53 is engaged with the gear 21 during the tape drive mechanism in the tape release position, the gear 21 and the spindle 9 are prohibited from being rotated regardless of rotation of the gear 16. The rotation of the gear 16 is converted into the reciprocal movement of the plate 29 which then performs the long stroke movement since the plate 25 is maintained still. Accordingly, the L-shaped lever 42 is rotated to cause the gear 36 to engage with the gear 33. Thus, the lever 47 is rotated counterclockwise to shift the T-shaped carrier plate 2 rightwardly, resulting in the play position of the tape drive mechanism, as shown in FIG. 13. This position is maintained by the contact between the electromagnet 51 and the segment 52.

When the tape drive mechanism is moved to the play position, the latch member 53 is disengaged from the gear 21 for allowing the gear 21 and the spindle 9 to rotated by the driving force applied thereto from the gear 16 through the clutch member 20. Accordingly, after the tape drive mechanism is set in the play position, the plate 29 repeats the short stroke movements.

Thereafter, when the power is cutoff, the electromagnet 51 is de-energized to release the segment 52. Accordingly, the biasing force of the spring 7 returns the tape drive mechanism back to the release position. If the power is supplied again, the tape drive mechanism is again set to the play position in the same manner.

Next, the mechanism for changing the tape winding direction is described.

Referring to FIGS. 1 and 2, a plate 64 movably mounted on a pin 66 is provided in association with the L-shaped lever 42. The plate 64 biased towards left-hand direction by a spring 68 (FIG. 9) is pushed rightwardly when the L-shaped lever 42 is rotated by the long stroke of the plate 29. A gear 59 having first and second teeth removed sections 60 and 60' at opposite sides of the gear 59 is provided adjacent the gear 33. Normally, one of the teeth removed sections 60 and 60' is held in face-to-face relation with the gear 33 for intercepting the transmission of driving force of the gear 33 to the gear 59. The gear 59 has, on its back flat surface, when viewed in FIG. 2, a pair of pins 62 and 62' which are located 180° apart from each other. Provided in association with the pins 62 and 62' is a hook lever 63 pivotally mounted on a pin 63a. The hook lever 63 is biased counterclockwise by a spring 65. The end of the hook lever 63 is formed with a hook engageable to pins 62 and 62', one at a time. The hook lever 63 further has a projection 63b which contacts with the plate 64 in a manner described later.

The front flat surface of the gear 59, when viewed in FIG. 1, is provided with a pin 61 slidingly engaged in an elongated recess 22a formed in the upper end portion of a plate 22. The plate 22 is further formed with a pair of elongated slits 22b and 22c both extending in a direction perpendicular to the recess 22a. A pair of pins 23a and 23b extending from the frame are located in the slits 22b and 22c, respectively, for guiding the plate 22 up and down. A spring 24a is connected between the pin 23a and the upper end of the plate 22 for urging the plate 22 downwardly. Similarly, a spring 24b is connected between the pin 23b and the lower end of the plate 22 for urging the plate 22 upwardly. When the plate 22 is moved down as shown in FIG. 1 in a manner described later, the biasing force of the spring 24b exceeds that of the spring 24a. Accordingly, in this condition, the plate 22 is urged upwardly. On the contrary, when the plate 22 is moved up, the biasing force of the spring 24a exceeds that of the spring 24b to urge the plate 22 downwardly.

A side of the plate 22 facing the gears 16 and 16' is formed with recesses 22d and 22e which are separated a predetermined distance from each other. When the plate 22 is moved down as shown in FIG. 1, the recess 22d receives the end of the lever 17 for tilting the lever 17 about the pin 18 clockwise, and the end of the lever 17' is held in contact with the side of the plate 22 above the recess 22e. Accordingly, the gear 16 is connected through the clutch member 20 with the gear 21, while the gear 16' is disconnected from the gear 21'.

On the other hand, when the plate 22 is moved up, the lever 17 comes into contact with a non-recessed portion while the lever 17' comes into contact with a recesses portion 22e. Accordingly, in this case, the gear 16 is disconnected from the gear 21 and the gear 16' is connected to the gear 21'.

Figure 9:
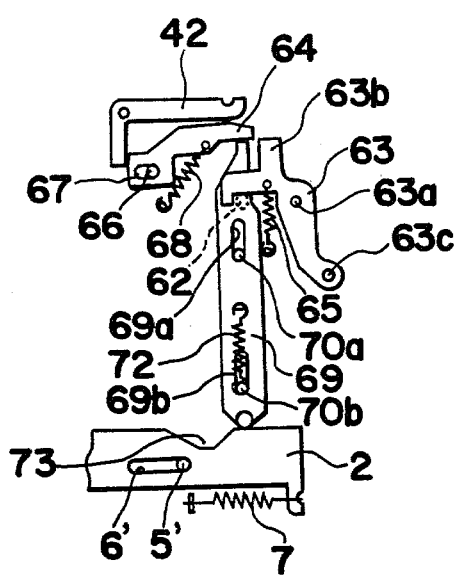
FIGS. 9 to 12 are schematic views showing movement of further incorporated elements.
Figure 10:
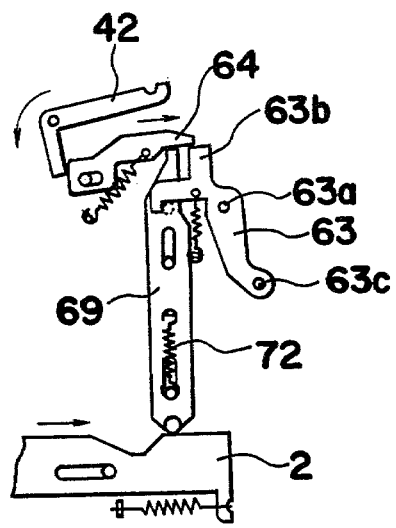
Figure 11:
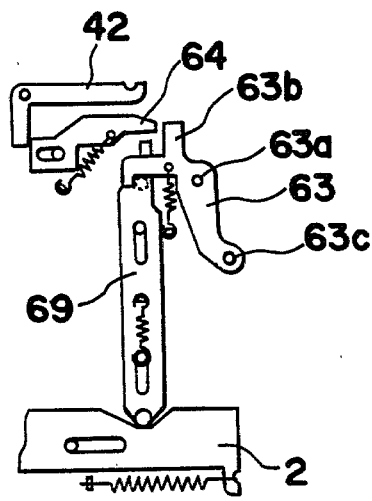
Figure 12:
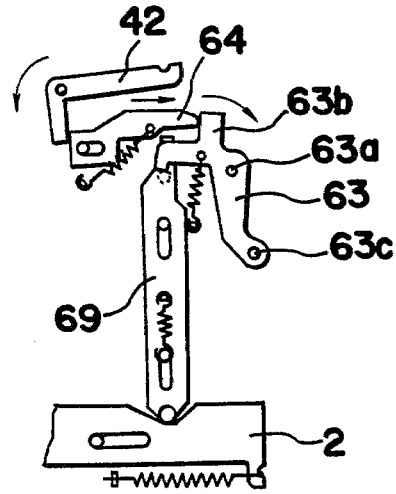

The mechanism for changing the tape winding direction further includes means for preventing the plate 64 from pushing the projection 63b when the tape drive mechanism is in the release position. The preventing means comprises an elongated plate 69 (FIGS. 1 and 9) positioned adjacent and parallel to the elongated plate 22. The plate 69 has a pair of slits 69a and 69b for receiving pins 70a and 70b, respectively, to allow up and down movement of the plate 69. A spring 72 is biased between the pin 70b and the plate 69 for urging the plate 69 downwardly. The lower end of the plate 69 is held in contact with the side edge of the T-shaped carrier plate 2 formed with a recess 73. The upper end of the plate 69 is positioned adjacent the plate 64. When the T-shaped plate 2 is moved to the left-hand direction, the plate 69 is held up by the engagement between the lower end of the plate 69 and the non-recessed edge portion of the T-shaped plate as shown in FIGS. 9 and 10. In this position, the upper end of the plate 69 is held in contact with the side of the plate 64 for preventing the tip of the plate 64 from being contacted with the projection 63b of the hook lever 63. On the other hand, when the T-shaped plate 2 is moved to the right-hand direction, the lower end of the plate 69 comes into contact with the recess 73 for moving downwardly the plate 69, as shown in FIGS. 11 and 12. In this position, the upper edge of the plate 69 is held away from the plate 64 for allowing the contact between the tip of the plate 64 and the projection 63b when the plate 64 is shifted rightwardly.

Now the thorough operation of the mechanism for changing the tape winding direction is explained.

When the tape driving mechanism is in the play position with the spindle 9 being driven, as shown in FIG. 13, the reel of the cassette mounted on the spindle 9 takes up the tape. When the tape ends, that is, when the tape in the cassette is all wound on the reel mounted on the spindle 9, the reels are forcibly stopped. Accordingly, the plate 25 which has been swinging about the spindle 9 by the rotation of gear 21 is stopped for effecting the long stroke of reciprocal movement of the plate 29, resulting in the counterclockwise rotation of the L-shaped lever 42 about the pin 43. The rotation of the L-shaped lever 42 causes the right-hand direction movement of the plate 64. Since the plate 69 is not held in contact with the plate 64, the plate 64 then pushes the projection 63b of the hook lever 63, as shown in FIG. 12.

It is to be noted here that counterclockwise rotation of the L-shaped lever 42 also causes the rotation of the gear 36 in the manner described above. However, since the lever 47 is already being held in contact with the electromagnet 51, the gear 36 merely rotates one complete turn and is stopped at its initial position by the contact between the pin 41 thereof and the end of the short arm of the L-shaped lever 42.

When the hook lever 63 is rotated, the engagement between the hook of the lever 63 and the pin 62 is released for allowing the rotation of the gear 59. The initial rotating force to the gear 59 is applied by the biasing force of the plate 22. In the example shown in FIG. 13, the plate 22 is biased upwardly by the spring 24b. Accordingly, when the gear 59 is freed from the hook lever 63, the gear 59 is first forcibly rotated counterclockwise by the biasing force of the spring 24b, and is further rotated by the engagement with the gear 33 until the gear 33 confronts the next coming teeth removed section of the gear 59, that is, when the gear 59 is rotated a half turn. During the rotation of the gear 59, the pin 61 on the gear 59 slidingly moves rightwardly and then leftwardly in the elongated recess 22a to locate the pin 61 above the center of the gear 59 when viewed in FIG. 13. After the gear 59 has been rotated a half turn, the hook lever 63 is engaged with the pin 62' for preventing a further rotation of the gear 59 and for holding the plate 22 in a shifted up position. When the plate 22 is shifted up, the lever 17 confronts non-recessed portion of the side of the plate 22 while the lever 17' confronts the recess 22e of the plate 22. Accordingly, the spindle 9' is driven and the spindle 9 is freed to take up the tape from the reel mounted on the spindle 9 onto the reel mounted on the spindle 9'.

It is to be noted that the movement of the plate 22 induces the pivotal movement of the pinch rollers 4 and 4' about their pins 4a and 4a', respectively, by any known methods for pressing the pinch roller 4 against the capstan 10 when the spindle 9 is driven and for pressing the pinch roller 4' against the capstan 10' when the spindle 9' is driven.

it is also to be noted that the hook lever 63 further includes a pin 63c which can be pushed by a suitable pushing member during any time of the tape play so as to rotate the lever 63 clockwise to change the tape winding direction in the above described manner.

It is further to be noted that plate 64 will not push the projection 63b of the hook lever 63 by the first long stroke of the plate 29 after the loading of the cassette tape, since in this case, the T-shaped carrier plate 2 is still shifted left to contact the lower end of the plate 69 with the edge of the plate 2 outside the recess 73.

Figure 14:
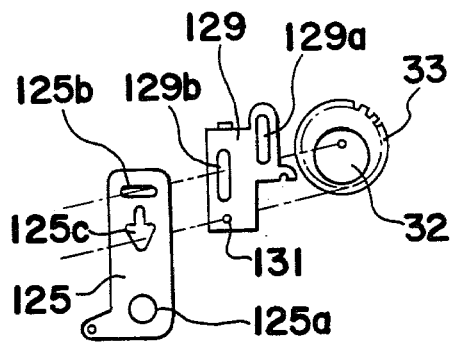
FIG. 14 is an exploded view showing a modification of incorporated elements.
Figure 15:
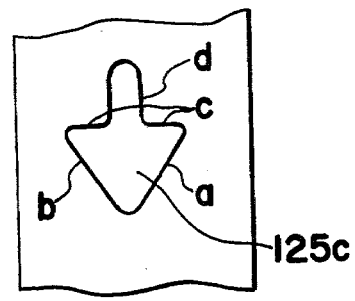
FIG. 15 is an enlarged fragmentary view of an arrowhead shaped opening formed in the incorporated element shown in FIG. 14.
Figure 16:
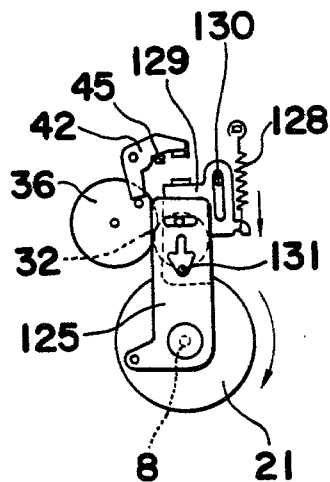
FIGS. 16 to 18 are schematic views showing movement of the elements shown in FIG. 14.
Figure 17:
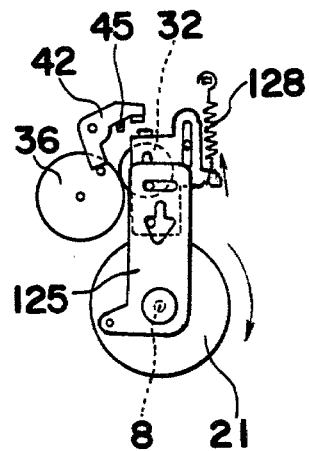

Referring to FIG. 14, there is shown an arrangement of plates 129 and 125, which are the modification of the plates 29 and 25 described above. The plate 129 has two slits 129a and 129b in which the slit 129a receives a pin 130 extending from the frame, and the slit 129b receives the axle of the gear 33, so as to allow up and down movement of the plate 129. The plate 129 is biased upwards by a spring 128. A pin 131 extends perpendicularly through the plate 129 with its opposite ends positioned on respective sides of the plate 129, a substantially intermediate portion of the pin 131 being fixed to the plate 129.

The plate 125 has as its one end portion a circle opening 125a for inserting the spindle 9 therein and a slit 125b at its other end portion. An arrowhead shaped opening 125c is formed at intermediate portion of the plate 125, pointing the opening 125a. When the plates 125 and 129 are assembled, one end of the pin 131 located above the front surface of the plate 129 when viewed in FIG. 14 is inserted into the arrowhead shaped opening 125c and the other end of the pin 131 located below the back surface of the plate 129 slidingly engages with the cam 32. The axle of the gear 33 is inserted into the slit 129b of the plate 129 and the slit 125b of the plate 125.

Figure 18:
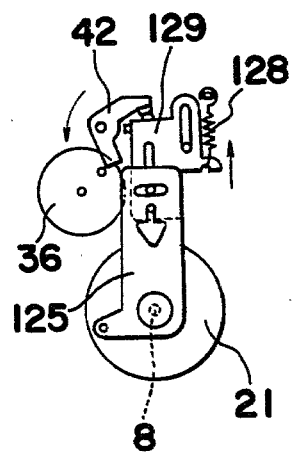
Figure 19:
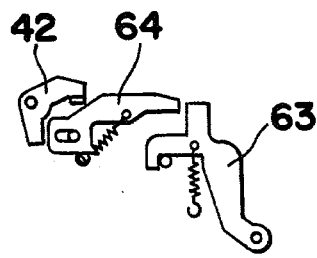
FIGS. 19 and 20 are schematic views showing movement of elements associated with elements shown in FIG. 14.
Figure 20:
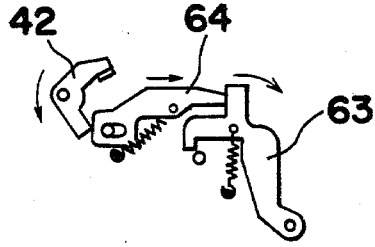

When the gear 33 rotates, the cam 32 pushes the pin 131 to effect the reciprocal movement of the plate 129. During the reciprocal movement of the plate 129 and when the gear 21 is rotated clockwise, the pin 131 in the arrowhead shaped opening 125c slide, as the plate 125 performs the swinging motion, along the side b of the opening 125c, resulting in the short stroke of the plate 129. On the other hand, when the gear 21 is not rotated, as occurred when the cassette tape has just been loaded, when the electric power has just been supplied, or when the tape ends, the plate 125 is set in alignment with the plate 129 upon termination of the pin 131 at the pointed end of the arrowhead opening 125c. Thereafter, when the plate 129 is moved upwards, the pin 131 is inserted into the recess portion d of the opening 125c to effect the long stroke of the plate 129, as shown in FIG. 18. Accordingly, the L-shaped lever 42 is rotated counterclockwise in a manner similar to that described above to start one rotation of the gear 36 and to start, when the plate 69 is held in the recess 73, the half rotation of the gear.

Now, a power supply circuit for supplying power to the cassette tape device assembled in combination with another electric device, such as a radio receiver, is explained.

Referring to FIG. 1, the power supply circuit comprises a first switch S1 having three terminals T1, T2 and T3. The terminal T1 of the switch S1 is connected to the motor 11 and the electromagnet 51, and the terminal T3 is connected to the radio receiver. The terminal T2 is connected to a reed R which is normally connected to the terminal T3, i.e., when the cassette tape is not loaded in the proper position. Upon loading of the cassette tape, the reed R is connected to the terminal T1. The power supply circuit further comprises a switch S2 having three terminals M1, M2 and M3. The terminal M1 is connected to the terminal T2 of the switch S2, the terminal M2 is connected to the radio receiver and the terminal M3 is connected through a main switch S3 to a source of electric power such as a battery E.

It is to be noted that the main switch S3 can be associated with an ignition key switch (not shown) when the arrangement of the cassette tape device and the radio receiver is installed in the automobile.

The switch S2 can be a manually operable switch selectively connecting terminal M3 to terminal M1 or M2, or can be a switch operable relative to the loading and unloading of the cassette tape. In the latter case, terminal M3 is connected to terminal M1 when the cassette tape is loaded and to terminal M2 when the cassette tape is not loaded. Also, in the latter case, it is possible to arrange the switch S1 as a manually operable switch.

In the description below, it is assumed that the switch S1 operates in association with the loading and unloading of the cassette tape and the switch S2 operates upon manual turning, as shown in FIGS. 1 and 13.

The operation of the power supply circuit is described.

Assuming that the switch S3 is on, and that the manually operable switch S2 is so turned that terminal M3 is connected to terminal M1, the cassette tape device is actuated upon loading of the cassette tape to set the tape drive mechanism to the play position. When the operator turns the switch S2 to connect terminal M3 with terminal M2 during play of the cassette tape, the power to the cassette tape device is cutoff and, in turn the power is supplied to the radio receiver to actuate the radio receiver. Upon cutoff of the power to the cassette tape device, the tape drive mechanism is automatically moved to its release position to free the magnetic tape from any tension, and to locate the pinch roller away from the capstan. Thereafter, when the operator turns the switch S2 to connect terminal M3 with terminal M1, the power is again supplied to the cassette tape device. Thereupon, the tape drive mechanism is again automatically moved to the play position to start playing the tape. Similarly, during play of the cassette tape, on and off operation of the switch S3 turns on and off the cassette tape device.

In this case, since the cassette tape can be remained in the loaded position even when the cassette tape device is turned off, the operation necessary to turn on, tune and control the radio receiver can be carried out without any difficulty in viewing the radio panel when compared with a type of cassette tape device which, when the cassette tape device is turned off, partly ejects the cassette tape out from the device to block the sight of the radio panel.

When the cassette tape is not loaded and when the main switch S3 is on, the radio receiver can be maintained actuated regardless of the state of the switch S2.

Since on and off control of the cassette tape device can be carried out by the main switch S3, it is possible, when the cassette tape device is installed in the automobile, to turn off the cassette tape device when the ignition key is turned off, and to continue tape playing when the ignition key is turned on without any further operation, such as ejection and insertion of the cassette tape.

Furthermore, during power cutoff, the magnetic tape can be freed from any tension and the pinch roller can be separated away from the capstan, the magnetic tape may not be undesirably permanently stretched, and the pinch roller may not become deformed. Accordingly, there will be no unacceptable wow in the reproduced signal from the cassette tape device.

Although the present invention has been fully described with reference to a preferred embodiment, many modifications and variations thereof will now be apparent to those skilled in the arrt, and the scope of the present invention is therefore to be limited not by the details of the preferred embodiment described above, but only by the terms of appended claims.

What is claimed is:

1. A cassette tape device having first and second spindle means adapted to receive first and second reels of a cassette, a tape drive mechanism having a play position in which the tape drive mechanism is positioned to advance and play a tape, and a release position in which the tape drive mechanism is positioned to cease advancing the tape, a motor means operatively coupled to said drive means, and a control means for controlling the movement of the tape drive mechanism between said play and release positions, wherein said control means comprises:
   spring means for urging said tape drive mechanism towards said release position;
   switch means for turning said motor means on and off;
   latch means for engaging at least one of said first and second spindles when the tape drive means is shifted to the release position, thereby preventing movement of said first and second spindles, and said latch means disengaging said first and second spindles when the tape drive means is shifted to the play position, thereby permitting rotation of said first and second spindles;
   detecting means for detecting when at least one of the first and second spindles is engaged by said latch means;
   shift means operatively coupled to said motor means for shifting tape drive mechanism against force of said spring means from the release position towards the play position by the rotational force of the motor means coupled thereto, when said detecting means detects that at least one of the first and second spindles is engaged by said latch means; and
   holding means comprising an electromagnet for holding said tape drive mechanism in said play position, said switch means turning said electromagnet on and off, whereby when said switch means is turned on, the motor means shifts the tape drive mechanism from the release position to the play position.

2. A cassette tape device having first and second driving means for driving first and second reels of the cassette, a tape drive mechanism having a play position in which the tape drive mechanism is positioned to advance and play a tape, and a release position in which the tape drive mechanism is positioned as to cease advancing the tape, and a control means for controlling the movement of the tape drive mechanism, wherein said control means comprises:
   an electric motor operatively coupled to said first and second driving means for driving at least one of the first and second driving means;
   switch means coupled to said motor for turning said motor means on and off;
   first and second spindle means for receiving said first and second reels, said first and second spindle means being rotated by the rotation of the first and second driving means, each spindle means being stopped from rotation when a predetermined external load is applied thereto;
   detecting means operatively coupled to said first driving means for detecting whether the first and second spindle means are driven, said detecting means being movable between a detecting position when the first and second spindle means are not driven and a non-detecting position when the first and second spindle means are driven;
   latch means for engaging at least one of said first and second spindle means, when the tape drive mechanism is in the release position, wherein the first and second spindle means are latched regardless of rotation of the first and second driving means, and for disengaging the first and second spindle means when the tape drive mechanism is moved to the play position to thereby allow the first and second spindle means to rotate;
   shifting means operatively coupled to said motor for shifting the tape drive mechanism from the release position towards the play position when said detecting means is moved to the detecting position; and
   retaining means for retaining the tape drive mechanism in the play position, said retaining means being energized by the operation of said switch means, wherein when said switch means is off and the tape drive mechanism is in the play position, the retaining means is de-energized, the tape drive mechanism returns towards the release position and the latch means engages at least one of the first and second spindle means and wherein the switch means is on, the detecting means is moved to the detecting position to thereby shift the tape drive mechanism towards the play position, and the retaining means is actuated to maintain the tape drive mechanism in the play position.

3. A cassette tape device as claimed in claim 2, wherein said detecting means comprises:
   means for producing a reciprocal movement in relation to the rotation of the first driving means;
   a first plate member having an engaging means, said first plate member being connected to the reciprocal movement producing means for making a reciprocal movement in a radial direction to the first spindle means in relation to rotational movement of the first driving means; and
   means for defining the length of the stroke of the reciprocal movement of the first plate member, said stroke defining means including a second plate member having an engageable means located at a position in association with the engaging means, said second plate member connected to the first spindle means for making a rotating motion, during when the first spindle means is rotated, within a range defined by the engagement between the engaging means and the engageable means to allow the first plate member to reciprocate a first predetermined distance of stroke defined by the engagement between the engaging means and the engageable means, said second plate member being held still when the first spindle means is not rotated to allow the first plate member to reciprocate a second predetermined distance of stroke defined by the engagement between the engaging means and the engageable means, said detecting position of the detecting means established when said first plate member terminates at the end of said second predetermined distance of stroke and said non-detecting position of the detecting means established when said first plate member terminates at the end of said first predetermined distance of stroke.

4. A cassette tape device as claimed in claim 3, wherein said engaging means is an opening formed in the first plate member, said opening having a configuration of an arrowhead pointing radial direction away from the center of the first spindle means, said engageable means being a pin projection extending from the second plate member for the engagement with said opening in the first plate member.

5. A cassette tape device as claimed in claim 3, wherein said engaging means is a pin projection extending from the first plate member, and said engageable means being an opening formed in the second plate member, said opening having a configuration of an arrowhead pointing the center of the first spindle means.

6. A cassette tape device as claimed in claim 2, wherein said retaining means is an electromagnet.

7. A cassette tape device as claimed in claim 2, further comprising:
first clutch means located between the first driving means and the first spindle means, said first spindle means being rotated in one direction when the first clutch means is turned on to connect the first driving means with the first spindle means, and said first spindle means being disconnected from the first driving means when the clutch means is turned off;
second clutch means located between the second driving means and the second spindle means, said second spindle means being rotated in a direction opposite to that of the first spindle means when the second clutch means is turned on to connect the second driving means with the second spindle means, and said second spindle means being disconnected from the second driving means when the second clutch means is turned off;
clutch control means movable between a first position in which the first clutch means is turned on and the second clutch means is turned off, and a second position in which the first clutch means is turned off and the second clutch means is turned on; and
means for alternately changing the position of the clutch control means between the first and second positions when said detecting means takes the detecting position, whereby when the detecting means takes the detecting position, the clutch control means is changed from one of its first and second positions to the other to change the direction of advance of the tape.

8. A cassette tape device as claimed in claim 7, further comprising a prohibiting means provided in association with the changing means for prohibiting the actuation of the changing means when the tape drive mechanism is in release position.

9. A cassette tape device as claimed in claim 2, further comprising:
a first three-terminal switch having a first terminal connected to the motor and also to the retaining means; a second terminal adapted for connection with an electrical device provided in combination with the cassette tape device; and a third terminal connected to a lead member normally connected to the second terminal, said lead member being connected to the first terminal when the cassette tape is properly positioned in the cassette tape device; and
a second three-terminal switch having a first terminal connected to the third terminal of the first three-terminal switch; a second terminal connected to the second terminal of the first three-terminal switch; and a third terminal connected through an on-off switch to a source of electric power, said third terminal of the second three terminal switch being selectively connectable to the first terminal of the second three-terminal switch and to the second terminal of the second three-terminal switch.

* * * * *